US012106717B2

(12) United States Patent
Kim

(10) Patent No.: US 12,106,717 B2
(45) **Date of Patent: *Oct. 1, 2024**

(54) PIXEL AND DISPLAY DEVICE INCLUDING PIXEL

(71) Applicant: Samsung Display Co., LTD., Yongin-si (KR)

(72) Inventor: Keunwoo Kim, Seongnam-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/362,335

(22) Filed: Jul. 31, 2023

(65) Prior Publication Data

US 2023/0377520 A1 Nov. 23, 2023

Related U.S. Application Data

(63) Continuation of application No. 17/871,089, filed on Jul. 22, 2022, now Pat. No. 11,715,422.

(30) Foreign Application Priority Data

Oct. 21, 2021 (KR) ........................ 10-2021-0140878

(51) Int. Cl.

*G09G 3/3241* (2016.01)
*G09G 3/3266* (2016.01)
*G09G 3/3291* (2016.01)

(52) U.S. Cl.

CPC ......... *G09G 3/3241* (2013.01); *G09G 3/3266* (2013.01); *G09G 3/3291* (2013.01);

(Continued)

(58) Field of Classification Search

CPC ... G09G 2300/0814; G09G 2300/0819; G09G 2300/0842; G09G 2320/045;

(Continued)

(56) References Cited

U.S. PATENT DOCUMENTS 7,180,486 B2 * 2/2007 Jeong .................. G09G 3/3233 345/82
8,587,578 B2 * 11/2013 Choi ...................... H05B 45/60 315/169.3

(Continued)

FOREIGN PATENT DOCUMENTS

CN 108154846 6/2018
KR 10-2021-0029330 3/2021

OTHER PUBLICATIONS

Hyung-Kyu Lim et al. "Threshold Voltage of Thin-Film Silicon-on-Insulator (SOI) MOSFET's", IEEE Transactions on Electron Devices, Oct. 1983, pp. 1244-1251, vol. ED-30, No. 10.

(Continued)

*Primary Examiner* — Michael J Jansen, II

(74) *Attorney, Agent, or Firm* — KILE PARK REED & HOUTTEMAN PLLC

(57) ABSTRACT

A pixel includes an organic light emitting diode that includes first and second terminals. A driving transistor generates a driving current, and includes a first terminal for a first power supply voltage, a second terminal connected to the first terminal of the organic light emitting diode, and a gate terminal for an initialization voltage. The first switching transistor includes a first terminal connected to a first node, a second terminal connected to the gate terminal of the driving transistor, and a gate terminal for a data initialization gate signal. The second switching transistor includes a first terminal for the initialization voltage, a second terminal connected to the first node, a first gate terminal for the data initialization gate signal, and a second gate terminal for a light emitting element initialization signal. The first terminal of the organic light emitting diode is connected to the first node.

20 Claims, 7 Drawing Sheets

(52) U.S. Cl.
CPC ............... *G09G 2300/0439* (2013.01); *G09G 2310/0278* (2013.01)

(58) Field of Classification Search
CPC ........... G09G 2330/028; G09G 3/3233; G09G 3/3241; G09G 3/3258; G09G 3/3291
See application file for complete search history.

(56) References Cited

U.S. PATENT DOCUMENTS

| | | | | | |
|---|---|---|---|---|---|
| 8,686,926 | B2 * | 4/2014 | Han | G09G 3/3233 345/82 |
| 9,001,009 | B2 * | 4/2015 | Choi | G09G 3/325 345/76 |
| 9,337,439 | B2 * | 5/2016 | Kwon | G09G 3/3258 |
| 9,564,083 | B2 * | 2/2017 | Bae | G09G 3/3266 |
| 9,748,321 | B2 * | 8/2017 | Kim | H10K 59/1213 |
| 9,842,543 | B2 * | 12/2017 | Zhou | G09G 3/3258 |
| 10,074,710 | B2 * | 9/2018 | Ebisuno | H10K 59/1213 |
| 10,276,092 | B2 * | 4/2019 | Oh | G09G 3/3283 |
| 10,482,817 | B2 | 11/2019 | Kim et al. | |
| 10,700,146 | B2 * | 6/2020 | Chai | H10K 59/12 |
| 10,789,881 | B2 * | 9/2020 | Park | G09G 3/3225 |
| 10,796,625 | B2 * | 10/2020 | Zhou | G09G 3/22 |
| 10,825,391 | B2 * | 11/2020 | Nam | G09G 3/3233 |
| 10,861,918 | B2 * | 12/2020 | Jeon | H10K 59/1213 |
| 10,872,570 | B2 * | 12/2020 | Kim | G09G 3/3233 |
| 10,923,506 | B2 * | 2/2021 | Park | H10K 59/131 |
| 10,943,528 | B2 * | 3/2021 | Zhou | G09G 3/32 |
| 10,978,537 | B2 * | 4/2021 | Ebisuno | H10K 59/121 |
| 11,049,458 | B1 | 6/2021 | Fan et al. | |
| 11,335,757 | B2 * | 5/2022 | Kim | G09G 3/3266 |
| 11,355,064 | B2 * | 6/2022 | Jeon | G09G 3/3233 |
| 11,404,522 | B2 * | 8/2022 | Yun | G09G 3/3275 |
| 11,410,607 | B2 * | 8/2022 | Roh | G09G 3/3266 |
| 11,615,744 | B2 * | 3/2023 | Kim | H10K 59/1213 345/214 |
| 11,651,730 | B2 * | 5/2023 | Lee | H10K 59/131 345/214 |
| 11,715,422 | B2 * | 8/2023 | Kim | G09G 3/3266 345/204 |
| 11,735,113 | B2 * | 8/2023 | Dong | G09G 3/3241 345/204 |
| 11,776,970 | B2 * | 10/2023 | Shin | H01L 27/1225 257/79 |
| 2006/0055336 | A1 | 3/2006 | Jeong | |
| 2011/0157125 | A1 | 6/2011 | Choi | |
| 2012/0001896 | A1 | 1/2012 | Han et al. | |
| 2013/0002632 | A1 | 1/2013 | Choi | |
| 2014/0210867 | A1 | 7/2014 | Kwon | |
| 2015/0170576 | A1 | 6/2015 | Bae | |
| 2016/0314742 | A1 | 10/2016 | Zhou | |
| 2017/0033171 | A1 | 2/2017 | Kim et al. | |
| 2017/0316737 | A1 | 11/2017 | Park | |
| 2017/0316739 | A1 | 11/2017 | Oh et al. | |
| 2018/0040682 | A1 | 2/2018 | Ebisuno et al. | |
| 2018/0069069 | A1 | 3/2018 | Ebisuno et al. | |
| 2018/0158406 | A1 | 6/2018 | Kim et al. | |
| 2018/0166516 | A1 | 6/2018 | Chai et al. | |
| 2018/0342195 | A1 | 11/2018 | Zhou | |
| 2019/0006390 | A1 | 1/2019 | Park | |
| 2019/0066598 | A1 | 2/2019 | Kim et al. | |
| 2019/0206320 | A1 | 7/2019 | Nam et al. | |
| 2019/0259822 | A1 | 8/2019 | Jeon et al. | |
| 2020/0135110 | A1 | 4/2020 | Yokoyama et al. | |
| 2020/0211448 | A1 | 7/2020 | Zhou | |
| 2020/0365677 | A1 | 11/2020 | Yun et al. | |
| 2021/0043709 | A1 | 2/2021 | Kim et al. | |
| 2021/0304672 | A1 | 9/2021 | Kim et al. | |
| 2021/0305340 | A1 | 9/2021 | Kim et al. | |
| 2021/0319747 | A1 | 10/2021 | Jeon et al. | |
| 2021/0408061 | A1 | 12/2021 | Shin et al. | |
| 2022/0044635 | A1 | 2/2022 | Roh et al. | |
| 2022/0084464 | A1 | 3/2022 | Lee et al. | |
| 2022/0238070 | A1 | 7/2022 | Kim | |
| 2022/0375408 | A1 | 11/2022 | Dong | |
| 2023/0130200 | A1 * | 4/2023 | Kim | G09G 3/3241 345/204 |

OTHER PUBLICATIONS

Keunwoo Kim et al., "Double-Gate CMOS: Symmetrical- Versus Asymmetrical-Gate Devices", IEEE Transactions on Electron Devices, Feb. 2001, pp. 294-299, vol. 48, No. 2.

* cited by examiner

PIXEL AND DISPLAY DEVICE INCLUDING PIXEL

CROSS-REFERENCE TO RELATED APPLICATION(S)

This is a continuation application of U.S. patent application Ser. No. 17/871,089, filed on Jul. 22, 2022 (now U.S. Pat. No. 11,715,422), the disclosure of which is incorporated herein by reference in its entirety. U.S. patent application Ser. No. 17/871,089 claims priority to and benefits of Korean Patent Application No. 10-2021-0140878 under 35 U.S.C. § 119 filed on Oct. 21, 2021, in the Korean Intellectual Property Office (KIPO), the entire contents of which are incorporated herein by reference.

BACKGROUND

1. Technical Field

Embodiments relate generally to a pixel and a display device. Embodiments relate to a pixel and a display device including a pixel.

2. Description of the Related Art

Flat panel display devices are used as display devices for replacing a cathode ray tube display device due to it being lightweight and having thin characteristics. As representative examples of such flat panel display devices, there are a liquid crystal display device, an organic light emitting display device, a quantum dot display device, and the like.

Recently, a display device that may be driven at various frequencies has been developed, and in order to increase efficiency of a battery included in the display device, it is necessary to reduce power consumption of pixels included in the display device. In order to reduce the power consumption of the pixels, in case that the pixels display a still image (or in case that the pixels are driven at a low frequency), a driving frequency of the pixels may be reduced so that the display device may be driven at a low frequency. However, while the pixels display an image based on data signals, in a high gray level of low-frequency driving, the data signals may be distorted by a leakage current or the like of transistors included in the pixels, and image quality of the display device may deteriorate. A light emitting element has to be initialized to an initialization voltage in low and middle gray levels of the low-frequency driving. However, since a threshold voltage of a transistor that applies the initialization voltage has a relatively small margin, a relatively small current may flow in case that the transistor is turned on, and a time for initializing the light emitting element may become relatively longer.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a pixel.

Embodiments provide a display device including a pixel.

According to embodiments, a pixel may include an organic light emitting diode; a driving transistor; a first switching transistor; and a second switching transistor. The organic light emitting diode outputs light based on a driving current, and may include a first terminal and a second terminal. The driving transistor generates the driving current, and may include a first terminal to which a first power supply voltage is applied; a second terminal electrically connected to the first terminal of the organic light emitting diode; and a gate terminal to which an initialization voltage is applied. The first switching transistor may include a first terminal electrically connected to a first node; a second terminal electrically connected to the gate terminal of the driving transistor; and a gate terminal to which a data initialization gate signal is applied. The second switching transistor may include a first terminal to which the initialization voltage is applied; a second terminal electrically connected to the first node, a first gate terminal to which the data initialization gate signal is applied; and a second gate terminal to which a light emitting element initialization signal is applied. The first terminal of the organic light emitting diode may be electrically connected to the first node.

In embodiments, the second switching transistor may include an NMOS transistor, and the second gate terminal of the second switching transistor may include a back gate terminal.

In embodiments, the first switching transistor and the second switching transistor may be electrically connected in series as a dual gate transistor.

In embodiments, the first switching transistor may include an NMOS transistor.

In embodiments, during an activation period of the data initialization gate signal, the first switching transistor and the second switching transistor may be turned on, and the gate terminal of the driving transistor may be initialized to the initialization voltage. During an activation period of the light emitting element initialization signal, the second switching transistor may be turned on, and the first terminal of the organic light emitting diode may be initialized to the initialization voltage.

In embodiments, the pixel may further include a third switching transistor electrically connected between the gate terminal of the driving transistor and the second terminal of the driving transistor.

In embodiments, the third switching transistor may include an NMOS transistor.

In embodiments, the third switching transistor may diode-connect the driving transistor in response to a compensation gate signal.

In embodiments, the pixel may further include a fourth switching transistor including a first terminal to which a data voltage is applied; a second terminal electrically connected to the first terminal of the driving transistor; and a gate terminal to which a data write gate signal is applied.

In embodiments, the pixel may further include a storage capacitor; a fifth switching transistor; and a sixth switching transistor. The storage capacitor may include a first terminal to which the first power supply voltage is applied; and a second terminal electrically connected to the gate terminal of the driving transistor. The fifth switching transistor may include a first terminal electrically connected to a first power supply voltage line to which the first power supply voltage is applied, a second terminal electrically connected to the first terminal of the driving transistor; and a gate terminal to which an emission signal is applied. The sixth switching transistor may include a first terminal electrically connected to the second terminal of the driving transistor; a second terminal electrically connected to the first terminal of the organic light emitting diode; and a gate terminal to which the emission signal is applied.

According to embodiments, a pixel may include an organic light emitting diode; a driving transistor; a dual gate transistor; a first switching transistor; and a second switching transistor. The organic light emitting diode outputs light based on a driving current, and may include a first terminal and a second terminal. The driving transistor generates the driving current, and may include a first terminal to which a first power supply voltage is applied; a second terminal electrically connected to the first terminal of the organic light emitting diode; and a gate terminal to which an initialization voltage is applied. The dual gate transistor may be electrically connected between the gate terminal of the driving transistor and the second terminal of the driving transistor, and the dual gate transistor may include a first sub-transistor and a second sub-transistor electrically connected in series. The first switching transistor may include a first terminal electrically connected to a first node, a second terminal connected to the gate terminal of the driving transistor, and a gate terminal to which a data initialization gate signal is applied. The second switching transistor may include a first terminal to which the initialization voltage is applied; a second terminal electrically connected to the first node; a first gate terminal to which the data initialization gate signal is applied; and a second gate terminal to which a light emitting element initialization signal is applied. The first terminal of the organic light emitting diode may be electrically connected to the first node.

In embodiments, the dual gate transistor, the first switching transistor, and the second switching transistor may each include a PMOS transistor, and the second gate terminal of the second switching transistor may include a back gate terminal.

In embodiments, the first switching transistor and the second switching transistor may be electrically connected in series as a dual gate transistor.

In embodiments, during an activation period of the data initialization gate signal, the first switching transistor and the second switching transistor may be turned on, and the gate terminal of the driving transistor may be initialized to the initialization voltage. During an activation period of the light emitting element initialization signal, the second switching transistor may be turned on, and the first terminal of the organic light emitting diode may be initialized to the initialization voltage.

In embodiments, the dual gate transistor may diode-connect the driving transistor in response to a compensation gate signal.

In embodiments, the pixel may further include a third switching transistor; a storage capacitor; a fourth switching transistor; and a fifth switching transistor. The third switching transistor may include a first terminal to which a data voltage is applied; a second terminal electrically connected to the first terminal of the driving transistor; and a gate terminal to which a data write gate signal is applied. The storage capacitor may include a first terminal to which the first power supply voltage is applied; and a second terminal electrically connected to the gate terminal of the driving transistor. The fourth switching transistor may include a first terminal electrically connected to a first power supply voltage line to which the first power supply voltage is applied; a second terminal electrically connected to the first terminal of the driving transistor; and a gate terminal to which an emission signal is applied. The fifth switching transistor may include a first terminal electrically connected to the second terminal of the driving transistor; a second terminal electrically connected to the first terminal of the organic light emitting diode; and a gate terminal to which the emission signal is applied.

According to embodiments, a display device may include a display panel including a pixel and a gate driver. The pixel may include an organic light emitting diode; a driving transistor; a first switching transistor; and a second switching transistor. The organic light emitting diode outputs light based on a driving current, and may include a first terminal and a second terminal. The driving transistor generates the driving current, and may include a first terminal to which a first power supply voltage is applied; a second terminal electrically connected to the first terminal of the organic light emitting diode electrically and a gate terminal to which an initialization voltage is applied. The first switching transistor may include a first terminal electrically connected to a first node; a second terminal electrically connected to the gate terminal of the driving transistor, and a gate terminal to which a data initialization gate signal is applied. The second switching transistor may include a first terminal to which the initialization voltage is applied; a second terminal electrically connected to the first node, a first gate terminal to which the data initialization gate signal is applied, and a second gate terminal to which a light emitting element initialization signal is applied. The first terminal of the organic light emitting diode is electrically connected to the first node. The gate driver generates a data write gate signal, the data initialization gate signal, a compensation gate signal, and the light emitting element initialization signal provide the data write gate signal, the data initialization gate signal, the compensation gate signal, and the light emitting element initialization signal to the pixel.

In embodiments, the first switching transistor and the second switching transistor may be electrically connected in series as a dual gate transistor. The first switching transistor and the second switching transistor may each include an NMOS transistor. The second gate terminal of the second switching transistor may include a back gate terminal.

In embodiments, the pixel may further include a third switching transistor; a fourth switching transistor; a fifth switching transistor; and a sixth switching transistor. The third switching transistor may be electrically connected between the gate terminal of the driving transistor and the second terminal of the driving transistor, and may include an NMOS transistor. The fourth switching transistor may include a first terminal to which a data voltage is applied; a second terminal electrically connected to the first terminal of the driving transistor; and a gate terminal to which the data write gate signal is applied. The storage capacitor may include a first terminal to which the first power supply voltage is applied and a second terminal electrically connected to the gate terminal of the driving transistor. The fifth switching transistor may include a first terminal electrically connected to a first power supply voltage line to which the first power supply voltage is applied; a second terminal electrically connected to the first terminal of the driving transistor; and a gate terminal to which an emission signal is applied. The sixth switching transistor may include a first terminal electrically connected to the second terminal of the driving transistor; a second terminal electrically connected to the first terminal of the organic light emitting diode; and a gate terminal to which the emission signal is applied.

In embodiments, the display device may further include an emission driver; a data driver; and a controller. The emission driver may generate an emission signal that provides the emission signal to the pixel. The data driver may generate a data voltage that provides the data voltage to the pixel. The controller may control an operation of each of the gate driver, the emission driver, and the data driver.

Since the display device according to embodiments may include the seventh transistor, which is an NMOS transistor and may include the second gate terminal, during the activation period of the light emitting element initialization signal, the first terminal of the organic light emitting diode may be initialized through a relatively large current, and the time for initializing the first terminal of the organic light emitting diode may become relatively shorter. Accordingly, in low-frequency driving of the display device, in case that the pixel is driven with low and middle gray levels, the first terminal of the organic light emitting diode may be initialized, so that a luminance of the organic light emitting diode may not be decreased.

Since the display device may include the third and fourth transistors that are NMOS transistors, in the low-frequency driving of the display device, in case that the pixel is driven with a high gray level, the luminance of the organic light emitting diode may not be decreased. Accordingly, in case that the display device is driven at a low frequency, the display device may be driven without the decrease of the luminance of the organic light emitting diode in all gray levels.

Furthermore, since the initialization voltage is used as a power supply voltage for initializing each of the gate terminal of the first transistor and the first terminal of the organic light emitting diode, a number of wires included in the pixel may be relatively reduced. Accordingly, an aperture ratio or a resolution of the display device may be relatively increased.

BRIEF DESCRIPTION OF THE DRAWINGS

Embodiments can be understood in more detail from the following description taken in conjunction with the accompanying drawings.

FIG. 2 is a schematic diagram of an equivalent circuit showing a pixel included in

FIG. 1.

DETAILED DESCRIPTION OF THE EMBODIMENTS

Figure 1:
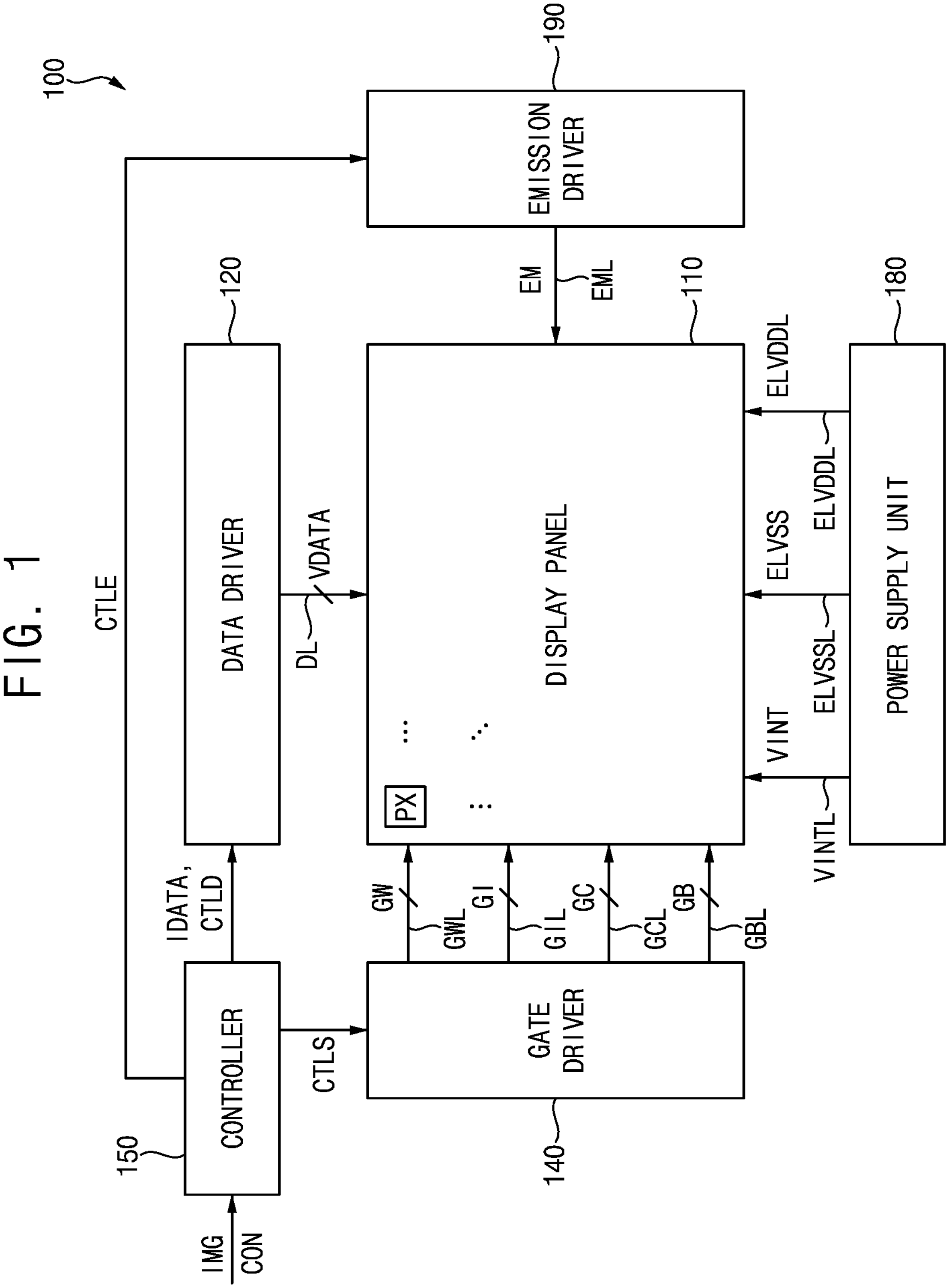
FIG. 1 is a block diagram showing a display device according to embodiments.

Hereinafter, pixels and display devices according to embodiments will be described in detail with reference to the accompanying drawings. In the accompanying drawings, the same or similar reference numerals refer to the same or similar elements.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

FIG. 1 is a block diagram showing a display device according to embodiments.

Referring to FIG. 1, a display device 100 may include a display panel 110 including pixels PX, a controller 150, a data driver 120, a gate driver 140, an emission driver 190, a power supply unit 180, and the like within the spirit and the scope of the disclosure. According to embodiments, the display device 100 may display an image at various driving frequencies (or an image refresh rate or a screen refresh rate) according to driving conditions.

The display panel 110 may include data lines DL, data write gate lines GWL, data initialization gate lines GIL, compensation gate lines GCL, light emitting element initialization lines GBL, emission lines EML, first power supply voltage lines ELVDDL, second power supply voltage lines ELVSSL, initialization voltage lines VINTL, and pixels PX connected to the lines.

According to the embodiments, each of the pixels PX may include at least two transistors, at least one capacitor, and a light emitting element, and the display panel 110 may be a light emitting display panel. According to the embodiments, the display panel 110 may be a display panel of an organic light emitting display device (OLED). According to other embodiments, the display panel 110 may include a display panel of a quantum dot display device (QDD), a display panel of a liquid crystal display device (LCD), a display panel of a field emission display device (FED), a display panel of a plasma display device (PDP), or a display panel of an electrophoretic display device (EPD).

The controller 150 (for example, a timing controller (T-CON)) may receive image data IMG and an input control signal CON from an external host processor (for example, an application processor (AP), a graphic processing unit (GPU), or a graphic card). The image data IMG may be RGB image data including red image data, green image data, and blue image data. The image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm (for example, dynamic capacitance compensation (DCC), etc.) for correcting image quality to the image data IMG supplied from the external host processor. In an embodiment, in case that the controller 150 does not include an algorithm for improving image quality, the image data IMG may be output as the input image data IDATA. The controller 150 may supply the input image data IDATA to the data driver 120.

The controller 150 may generate a data control signal CTLD for controlling an operation of the data driver 120, a gate control signal CTLS for controlling an operation of the gate driver 140, and an emission control signal CTLE for controlling an operation of the emission driver 190 based on the input control signal CON. For example, the gate control signal CTLS may include a vertical start signal, gate clock signals, and the like, and the data control signal CTLD may include a horizontal start signal, a data clock signal, and the like within the spirit and the scope of the disclosure.

The gate driver 140 may generate data write gate signals GW, data initialization gate signals GI, compensation gate signals GC, and light emitting element initialization signals GB based on the gate control signal CTLS received from the controller 150. The gate driver 140 may output the data write gate signals GW, the data initialization gate signals GI, the compensation gate signals GC, and the light emitting element initialization signals GB to the pixels PX connected to the data write gate lines GWL, the data initialization gate lines GIL, the compensation gate lines GCL, and the light emitting element initialization lines GBL.

The emission driver 190 may generate emission signals EM based on the emission control signal CTLE received from the controller 150. The emission driver 190 may output the emission signals EM to the pixels PX connected to the emission lines EML.

The power supply unit 180 may generate an initialization voltage VINT, a first power supply voltage ELVDD, and a second power supply voltage ELVSS, and may provide the initialization voltage VINT, the first power supply voltage ELVDD, and the second power supply voltage ELVSS to the pixels PX through the initialization voltage line VINTL, the first power supply voltage line ELVDDL, and the second power supply voltage line ELVSSL.

The data driver 120 may receive the data control signal CTLD and the input image data IDATA from the controller 150. The data driver 120 may convert digital input image data IDATA into an analog data voltage by using a gamma reference voltage generated by a gamma reference voltage generator (not shown). The analog data voltage obtained by the conversion will be defined as a data voltage VDATA. The data driver 120 may output data voltages VDATA to the pixels PX connected to the data lines DL based on the data control signal CTLD. According to other embodiments, the data driver 120 and the controller 150 may be implemented as a single integrated circuit, and such an integrated circuit may be referred to as a timing controller-embedded data driver (TED).

Figure 2:
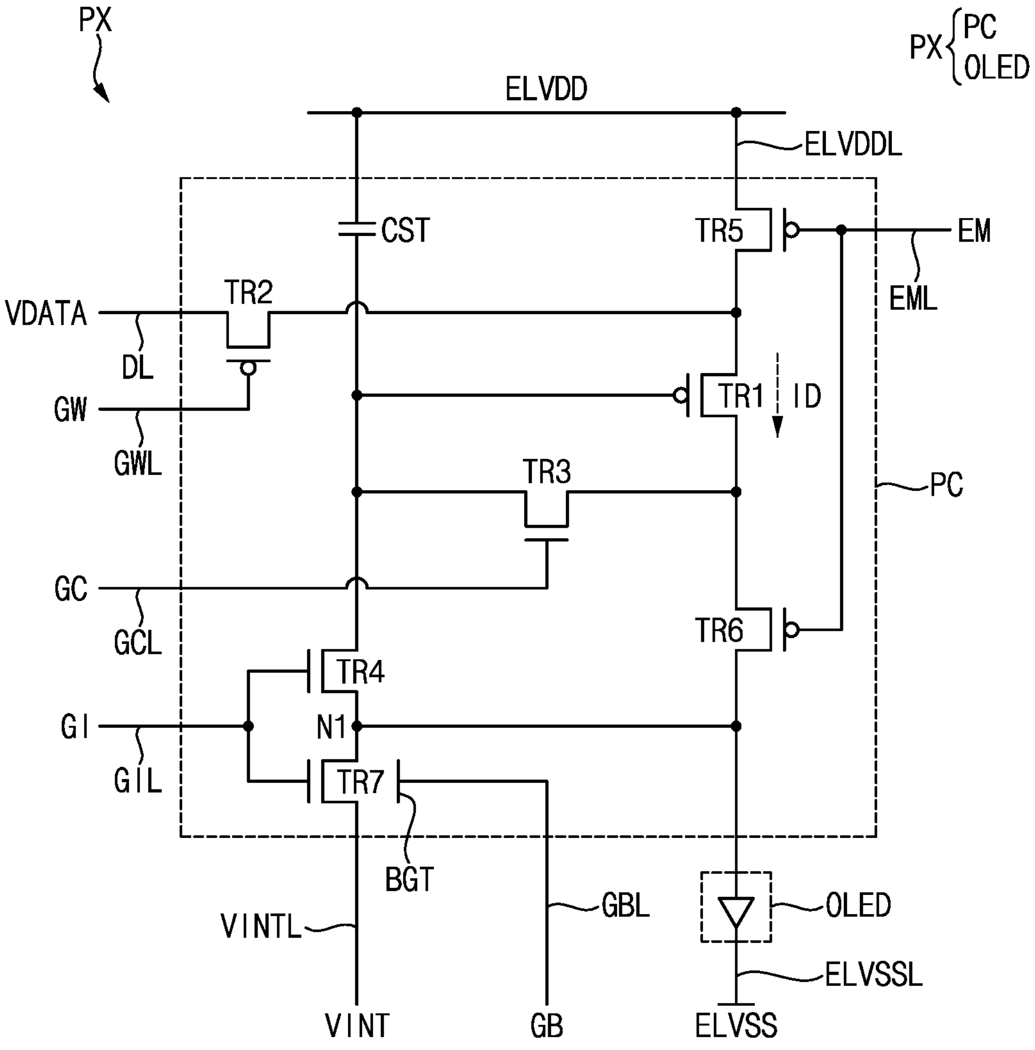

FIG. 2 is a schematic diagram of an equivalent circuit showing a pixel included in FIG. 1.

Referring to FIG. 2, the display device 100 may include a pixel PX, and the pixel PX may include a pixel circuit PC and an organic light emitting diode OLED. The pixel circuit PC may include first to seventh transistors TR1, TR2, TR3, TR4, TR5, TR6, and TR7, a storage capacitor CST, and the like within the spirit and the scope of the disclosure. The pixel circuit PC or the organic light emitting diode OLED may be connected to the first power supply voltage line ELVDDL, the second power supply voltage line ELVSSL, the initialization voltage line VINTL, the light emitting element initialization line GBL, the data line DL, the data write gate line GWL, the data initialization gate line GIL, the compensation gate line GCL, the emission line EML, and the like within the spirit and the scope of the disclosure. The first transistor TR1 may correspond to a driving transistor, and the second to seventh transistors TR2, TR3, TR4, TR5, TR6, and TR7 may correspond to switching transistors. Each of the first to seventh transistors TR1, TR2, TR3, TR4, TR5, TR6, and TR7 may include a first terminal, a second terminal, and a gate terminal. According to the embodiments, the first terminal may be a source terminal, and the second terminal may be a drain terminal. In an embodiment, the first terminal may be a drain terminal, and the second terminal may be a source terminal.

According to the embodiments, each of the first, second, fifth, and sixth transistors TR1, TR2, TR5, and TR6 may be a PMOS transistor, and may have a channel including polysilicon. Each of the third, fourth, and seventh transistors TR3, TR4, and TR7 may be an NMOS transistor, and may have a channel including a metal oxide semiconductor. Furthermore, the seventh transistor TR7 may further include a second gate terminal BGT (for example, a back gate terminal or a lower gate terminal).

The organic light emitting diode OLED may output a light based on a driving current ID. The organic light emitting diode OLED may include a first terminal and a second terminal. According to the embodiments, the first terminal of the organic light emitting diode OLED may receive the first power supply voltage ELVDD, and the second terminal of the organic light emitting diode OLED may receive the second power supply voltage ELVSS. The first power supply voltage ELVDD and the second power supply voltage ELVSS may be provided from the power supply unit 180 through the first power supply voltage line ELVDDL and the second power supply voltage line ELVSSL, respectively. For example, the first terminal of the organic light emitting diode OLED may be an anode terminal, and the second terminal of the organic light emitting diode OLED may be a cathode terminal. In an embodiment, the first terminal of the organic light emitting diode OLED may be a cathode terminal, and the second terminal of the organic light emitting diode OLED may be an anode terminal.

The first power supply voltage ELVDD may be applied to the first terminal of the first transistor TR1. The second terminal of the first transistor TR1 may be connected to the first terminal of the organic light emitting diode OLED. The initialization voltage VINT may be applied to the gate terminal of the first transistor TR1. The initialization voltage VINT may be provided from the power supply unit 180 through the initialization voltage line VINTL.

The first transistor TR1 may generate the driving current ID. According to the embodiments, the first transistor TR1 may operate in a saturation region. The first transistor TR1 may generate the driving current ID based on a voltage difference between the gate terminal and the source terminal of the first transistor TR1. Gray levels may be expressed based on a magnitude of the driving current ID supplied to the organic light emitting diode OLED. In an embodiment, the first transistor TR1 may operate in a linear region. The gray levels may be expressed based on a sum of a time during which the driving current is supplied to the organic light emitting diode OLED within one frame.

The gate terminal of the second transistor TR2 (for example, a fourth switching transistor) may receive the data write gate signal GW. The data write gate signal GW may be provided from the gate driver 140 through the data write gate line GWL. The first terminal of the second transistor TR2 may receive the data voltage VDATA. The data voltage VDATA may be provided from the data driver 120 through the data line DL. The second terminal of the second transistor TR2 may be connected to the first terminal of the first transistor TR1. The second transistor TR2 may supply the data voltage VDATA to the first terminal of the first transistor TR1 during an activation period of the data write gate signal GW. The second transistor TR2 may operate in a linear region.

The gate terminal of the third transistor TR3 (for example, a third switching transistor) may receive the compensation gate signal GC. The compensation gate signal GC may be provided from the gate driver 140 through the compensation gate line GCL. The first terminal of the third transistor TR3 may be connected to the gate terminal of the first transistor TR1. The second terminal of the third transistor TR3 may be connected to the second terminal of the first transistor TR1. In other words, the third transistor TR3 may be connected between the gate terminal of the first transistor TR1 and the second terminal of the first transistor TR1.

The third transistor TR3 may connect the gate terminal of the first transistor TR1 to the second terminal of the first transistor TR1 during an activation period of the compensation gate signal GC. The third transistor TR3 may operate in a linear region. For example, the third transistor TR3 may diode-connect the first transistor TR1 during the activation period of the compensation gate signal GC. In other words, the third transistor TR3 may diode-connect the first transistor TR1 in response to the compensation gate signal GC. Since the first transistor TR1 is diode-connected, a voltage difference corresponding to a threshold voltage of the first transistor TR1 may occur between the first terminal of the first transistor TR1 and the gate terminal of the first transistor TR1. The threshold voltage may have a negative value. As a result, a voltage obtained by summing up the data voltage VDATA supplied to the first terminal of the first transistor TR1 and the voltage difference (for example, the threshold voltage) may be supplied to the gate terminal of the first transistor TR1 during the activation period of the data write gate signal GW. In other words, the data voltage VDATA may be compensated for by the threshold voltage of the first transistor TR1, and the compensated data voltage VDATA may be supplied to the gate terminal of the first transistor TR1.

According to the embodiments, the third transistor TR3 may include an NMOS transistor as described above, and the NMOS transistor may relatively reduce a leakage current, compared to the PMOS transistor. For example, in case that the leakage current is generated in the third transistor TR3, a voltage of the gate terminal of the first transistor TR1 may be increased, and the driving current ID may be decreased, so that a luminance may be decreased. Accordingly, in case that the display device 100 is driven at a low frequency, in order to reduce the leakage current of the third transistor TR3 in a high gray level, the third transistor TR3 may be an NMOS transistor.

The gate terminal of the fourth transistor TR4 (for example, a first switching transistor) may receive the data initialization gate signal GI. The data initialization gate signal GI may be provided from the gate driver 140 through the data initialization gate line GIL. The first terminal of the fourth transistor TR4 may be connected to a first node N1, and may receive the initialization voltage VINT. The first node N1 may connect the fourth transistor TR4, the seventh transistor TR7, and the first terminal of the organic light emitting diode OLED to each other. The second terminal of the fourth transistor TR4 may be connected to the gate terminal of the first transistor TR1 (or the first terminal of the third transistor TR3). In other words, the fourth transistor TR4 may be connected between the first terminal of the third transistor TR3 and the seventh transistor TR7.

The fourth transistor TR4 may supply the initialization voltage VINT to the gate terminal of the first transistor TR1 during an activation period of the data initialization gate signal GI. The fourth transistor TR4 may operate in a linear region. In other words, the fourth transistor TR4 may initialize the gate terminal of the first transistor TR1 to the initialization voltage VINT during the activation period of the data initialization gate signal GI. According to the embodiments, the initialization voltage VINT may have a voltage level that is sufficiently lower than a voltage level of the data voltage VDATA maintained by the storage capacitor CST in a previous frame, and the initialization voltage VINT may be supplied to the gate terminal of the first transistor TR1. According to other embodiments, the initialization voltage VINT may have a voltage level that is sufficiently higher than the voltage level of the data voltage VDATA maintained by the storage capacitor CST in the previous frame, and the initialization voltage VINT may be supplied to the gate terminal of the first transistor TR1. In an embodiment, the data initialization gate signal GI may be substantially the same as the data write gate signal GW of one horizontal time before. For example, the data initialization gate signal GI supplied to pixels PX in an $n^{th}$ row (where n is an integer that is greater than or equal to 2) among the pixels PX included in the display device 100 may be a signal that is substantially the same as the data write gate signal GW supplied to pixels PX in an $(n-1)^{th}$ row among the pixels PX. In other words, an activated data write gate signal GW may be supplied to the pixels PX in the $(n-1)^{th}$ row among the pixels PX, so that an activated data initialization gate signal GI may be supplied to the pixels PX in the $n^{th}$ row among the pixels PX. As a result, the data voltage VDATA may be supplied to the pixels PX in the $(n-1)^{th}$ row among the pixels PX, and simultaneously, the gate terminal of the first transistor TR1 included in the pixels PX in the $n^{th}$ row among the pixels PX may be initialized to the initialization voltage VINT.

The fourth transistor TR4 may include an NMOS transistor as described above, and the NMOS transistor may relatively reduce a leakage current, compared to the PMOS transistor. For example, in case that the leakage current is generated in the fourth transistor TR4, the voltage of the gate terminal of the first transistor TR1 may be increased, and the driving current ID may be decreased, so that the luminance may be decreased. Accordingly, in case that the display device 100 is driven at a low frequency, in order to reduce the leakage current of the fourth transistor TR4 in a high gray level, the fourth transistor TR4 may be an NMOS transistor.

The gate terminal of the fifth transistor TR5 (for example, a fifth switching transistor) may receive the emission signal EM. The emission signal EM may be provided from the emission driver 190 through the emission line EML. The first terminal of the fifth transistor TR5 may receive the first power supply voltage ELVDD. The second terminal of the fifth transistor TR5 may be connected to the first terminal of the first transistor TR1. The fifth transistor TR5 may supply the first power supply voltage ELVDD to the first terminal of the first transistor TR1 during an activation period of the emission signal EM. On the contrary, the fifth transistor TR5 may cut off the supply of the first power supply voltage ELVDD during an inactivation period of the emission signal EM. The fifth transistor TR5 may operate in a linear region. Since the fifth transistor TR5 supplies the first power supply voltage ELVDD to the first terminal of the first transistor TR1 during the activation period of the emission signal EM, the first transistor TR1 may generate the driving current ID. Since the fifth transistor TR5 cuts off the supply of the first power supply voltage ELVDD during the inactivation period of the emission signal EM, the data voltage VDATA supplied to the first terminal of the first transistor TR1 may be supplied to the gate terminal of the first transistor TR1.

The gate terminal of the sixth transistor TR6 (for example, a sixth switching transistor) may receive the emission signal EM. The first terminal of the sixth transistor TR6 may be connected to the second terminal of the first transistor TR1. The second terminal of the sixth transistor TR6 may be connected to the first terminal of the organic light emitting diode OLED. The sixth transistor TR6 may supply the driving current ID generated by the first transistor TR1 to the organic light emitting diode OLED during the activation period of the emission signal EM. The sixth transistor TR6 may operate in a linear region. In other words, since the sixth transistor TR6 supplies the driving current ID generated by the first transistor TR1 to the organic light emitting diode OLED during the activation period of the emission signal EM, the organic light emitting diode OLED may output the light. Since the sixth transistor TR6 electrically separates the first transistor TR1 and the organic light emitting diode OLED from each other during the inactivation period of the emission signal EM, the compensated data voltage VDATA supplied to the second terminal of the first transistor TR1 may be supplied to the gate terminal of the first transistor TR1.

A first gate terminal (or an upper gate terminal) of the seventh transistor TR7 (for example, a second switching transistor) may receive the data initialization gate signal GI. The first terminal of the seventh transistor TR7 may receive the initialization voltage VINT. The second terminal of the seventh transistor TR7 may be connected to the first node N1. In other words, the seventh transistor TR7 may be connected between the initialization voltage line VINTL and the fourth transistor TR4. For example, the fourth transistor TR4 and the seventh transistor TR7 may be connected in series to function as a dual gate transistor. According to the embodiments, as described above, the seventh transistor TR7 may include an NMOS transistor, and may further include the second gate terminal BGT. The second gate terminal BGT of the seventh transistor TR7 may receive the light emitting element initialization signal GB. The light emitting element initialization signal GB may be provided from the gate driver 140 through the light emitting element initialization line GBL. The seventh transistor TR7 may supply the initialization voltage VINT to the first terminal of the organic light emitting diode OLED through the first node N1 during an activation period of the light emitting element initialization signal GB. The seventh transistor TR7 may operate in a linear region. In other words, the seventh transistor TR7 may initialize the first terminal of the organic light emitting diode OLED to the initialization voltage VINT during the activation period of the light emitting element initialization signal GB.

For example, according to an example display device, a seventh transistor TR7 may be a PMOS transistor. At this point, a voltage level of an initialization voltage VINT may be approximately −3 V, a voltage level of a light emitting element initialization signal GB may be approximately −7 V, and a voltage level applied to a first terminal of an organic light emitting diode OLED may be approximately −3 V. In case that the seventh transistor TR7 is turned on, a voltage difference between a gate terminal and a source terminal of the seventh transistor TR7 may be approximately −4 V. In case that a threshold voltage of the seventh transistor TR7 is approximately −3 V, a difference between the voltage difference and the threshold voltage may be approximately −1 V (for example, the threshold voltage may have a relatively small margin), and a relatively small current may flow in case that the seventh transistor TR7 is turned on. Accordingly, a time for initializing the first terminal of the organic light emitting diode OLED may become relatively longer.

According to the embodiments, the seventh transistor TR7 may be the NMOS transistor. At this time, a voltage level of the initialization voltage VINT may be approximately −3 V, a voltage level of the light emitting element initialization signal GB may be approximately +7 V, and a voltage level applied to the first terminal of the organic light emitting diode OLED may be approximately −3 V. In case that the seventh transistor TR7 is turned on during the activation period of the light emitting element initialization signal GB, a voltage difference between the second gate terminal BGT and the source terminal of the seventh transistor TR7 may be approximately +10 V. In case that a threshold voltage of the seventh transistor TR7 is approximately +4 V during the activation period of the light emitting element initialization signal GB, a difference between the voltage difference and the threshold voltage may be approximately +6 V (for example, the threshold voltage may have a relatively large margin), and a relatively large current may flow in case that the seventh transistor TR7 is turned on during the activation period of the light emitting element initialization signal GB. Accordingly, a time for initializing the first terminal of the organic light emitting diode OLED may become relatively shorter.

The storage capacitor CST may be connected between the first power supply voltage line ELVDDL and the gate terminal of the first transistor TR1. The storage capacitor CST may include a first terminal and a second terminal. For example, the first terminal of the storage capacitor CST may receive the first power supply voltage ELVDD, and the second terminal of the storage capacitor CST may be connected to the gate terminal of the first transistor TR1. The storage capacitor CST may maintain the voltage level of the gate terminal of the first transistor TR1 during an inactivation period of the data write gate signal GW. The inactivation period of the data write gate signal GW may include the activation period of the emission signal EM, and the driving current ID generated by the first transistor TR1 may be supplied to the organic light emitting diode OLED during the activation period of the emission signal EM. Therefore, the driving current ID generated by the first transistor TR1 may be supplied to the organic light emitting diode OLED based on the voltage level maintained by the storage capacitor CST.

However, although the pixel circuit PC according to the disclosure has been described as including one driving transistor, six switching transistors, and one storage capacitor, the configuration of the disclosure is not limited thereto. For example, the pixel circuit PC may have a configuration including at least one driving transistor, at least one switching transistor, and at least one storage capacitor.

Although the light emitting element included in the pixel PX according to the disclosure has been described as including the organic light emitting diode OLED, the configuration of the disclosure is not limited thereto. For example, the light emitting element may include a quantum dot (QD) light emitting element, an inorganic light emitting diode, and the like within the spirit and the scope of the disclosure.

Since the display device 100 according to embodiments may include the seventh transistor TR7, which is an NMOS transistor and may include the second gate terminal BGT, during the activation period of the light emitting element initialization signal GB, the first terminal of the organic light emitting diode OLED may be initialized through a relatively large current, and the time for initializing the first terminal of the organic light emitting diode OLED may become relatively shorter. Accordingly, in low-frequency driving of the display device 100, in case that the pixel PX is driven with low and middle gray levels, the first terminal of the organic light emitting diode OLED may be initialized, so that a luminance of the organic light emitting diode OLED may not be decreased.

Since the display device 100 may include the third and fourth transistors TR3 and TR4 that are NMOS transistors, in the low-frequency driving of the display device 100, in case that the pixel PX is driven with a high gray level, the luminance of the organic light emitting diode OLED may not be decreased. Accordingly, in case that the display device 100 is driven at a low frequency, the display device 100 may be driven without the decrease of the luminance of the organic light emitting diode OLED in all gray levels.

Furthermore, since the initialization voltage VINT is used as a power supply voltage for initializing each of the gate terminal of the first transistor TR1 and the first terminal of the organic light emitting diode OLED, a number of wires included in the pixel PX may be relatively reduced. Accordingly, an aperture ratio or a resolution of the display device 100 may be relatively increased.

In a display device including a structure in which a camera is disposed under or below a substrate, a pixel located (or disposed) on a portion in which the camera is disposed may include a transmission window. The camera may collect an external light through the transmission window. A pixel circuit may be disposed in a relatively small area of the pixel including the transmission window. According to embodiments the pixel PX in which the number of the wires is relatively reduced may be applied to the pixel including the transmission window.

Figure 3:
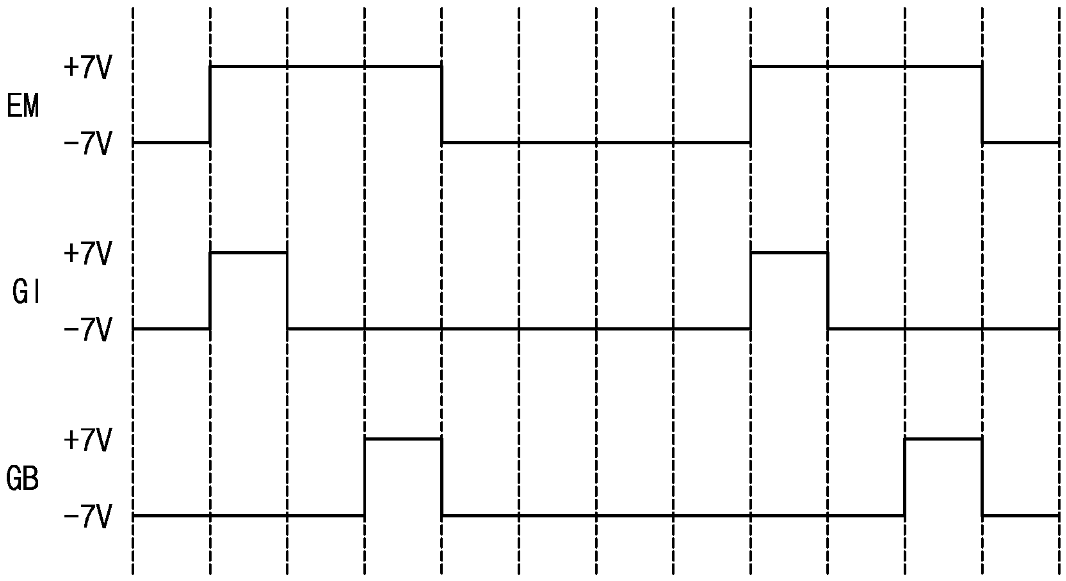
FIG. 3 is a timing diagram for describing signals for driving the display device of FIG. 1.
Figure 4:
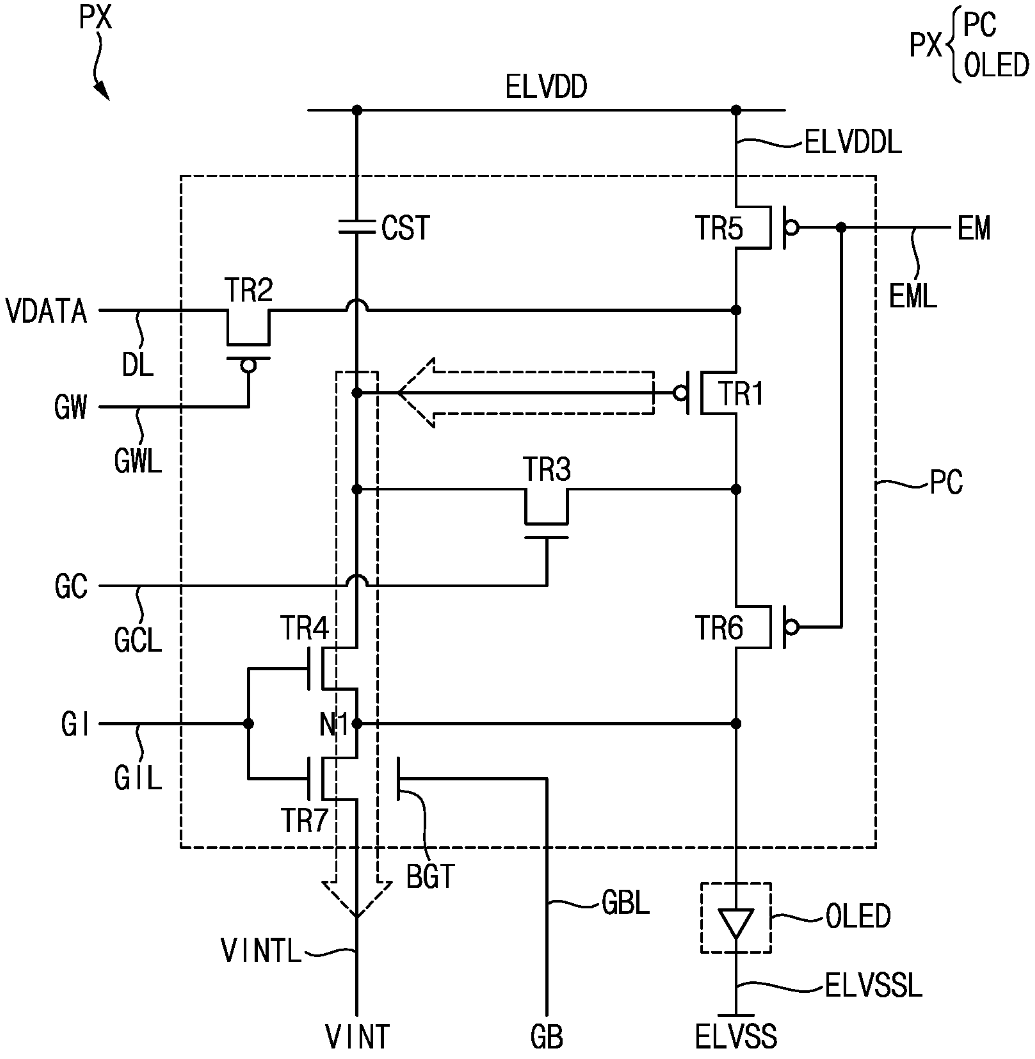
FIGS. 4 and 5 are circuit diagrams for describing the timing diagram of FIG. 3.
Figure 5:
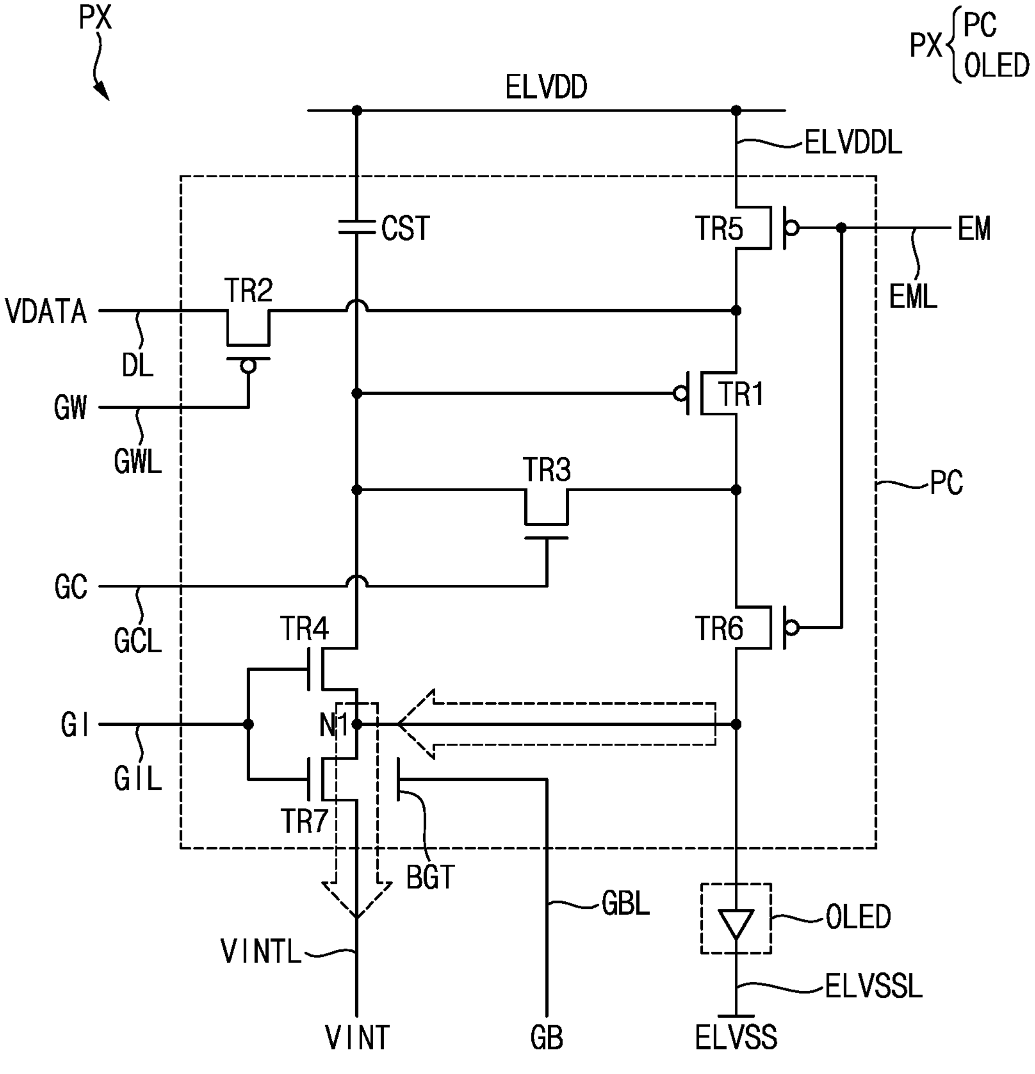

FIG. 3 is a timing diagram for describing signals for driving the display device of FIG. 1, and FIGS. 4 and 5 are circuit diagrams for describing the timing diagram of FIG. 3.

Referring to FIGS. 3, 4, and 5, the inactivation period (for example, a logic high level period) of the emission signal EM may overlap the activation period of each of the data initialization gate signal GI, the data write gate signal GW, the compensation gate signal GC, and the light emitting element initialization signal GB.

In case that the inactivation period of the emission signal EM starts after the activation period (for example, a logic low level period) of the emission signal EM ends, the activation period (for example, a logic high level period) of the data initialization gate signal GI may start. As shown in FIG. 4, the fourth and seventh transistors TR4 and TR7 may be turned on during the logic high level period of the data initialization gate signal GI, and a current may flow out from the gate terminal of the first transistor TR1 to the initialization voltage line VINTL. In other words, during the activation period of the data initialization gate signal GI, the gate terminal of the first transistor TR1 may be initialized to the initialization voltage VINT.

Referring to FIGS. 3 and 5, after the activation period of the data initialization gate signal GI ends, the activation period (for example, a logic high level period) of the light emitting element initialization signal GB may start. As shown in FIG. 5, the seventh transistor TR7 may be turned on during the logic high level period of the light emitting element initialization signal GB, and a current may flow out from the first terminal of the organic light emitting diode OLED to the initialization voltage line VINTL. In other words, during the activation period of the light emitting element initialization signal GB, the first terminal of the organic light emitting element OLED may be initialized to the initialization voltage VINT.

The activation period of the data write gate signal GW and the activation period of the compensation gate signal GC may be located (or disposed) between the activation period of the data initialization gate signal GI and the activation period of the light emitting element initialization signal GB. For example, after the activation period of the data initialization gate signal GI ends, the activation period (for example, a logic low level period) of the data write gate signal GW may start. During the logic low level period of the data write gate signal GW, the second transistor TR2 may be turned on, and may provide the data voltage VDATA to the second terminal of the first transistor TR1. After the activation period of the data write gate signal GW ends, the activation period (for example, a logic high level period) of the compensation gate signal GC may start. During the logic high level period of the compensation gate signal GC, the third transistor TR3 may be turned on, and may provide the data voltage VDATA, which is provided to the second terminal of the first transistor TR1, to the gate terminal of the first transistor TR1.

In an embodiment, the activation periods of the data initialization gate signal GI, the data write gate signal GW, the compensation gate signal GC, and the light emitting element initialization signal GB may at least partially overlap each other.

Figure 6:
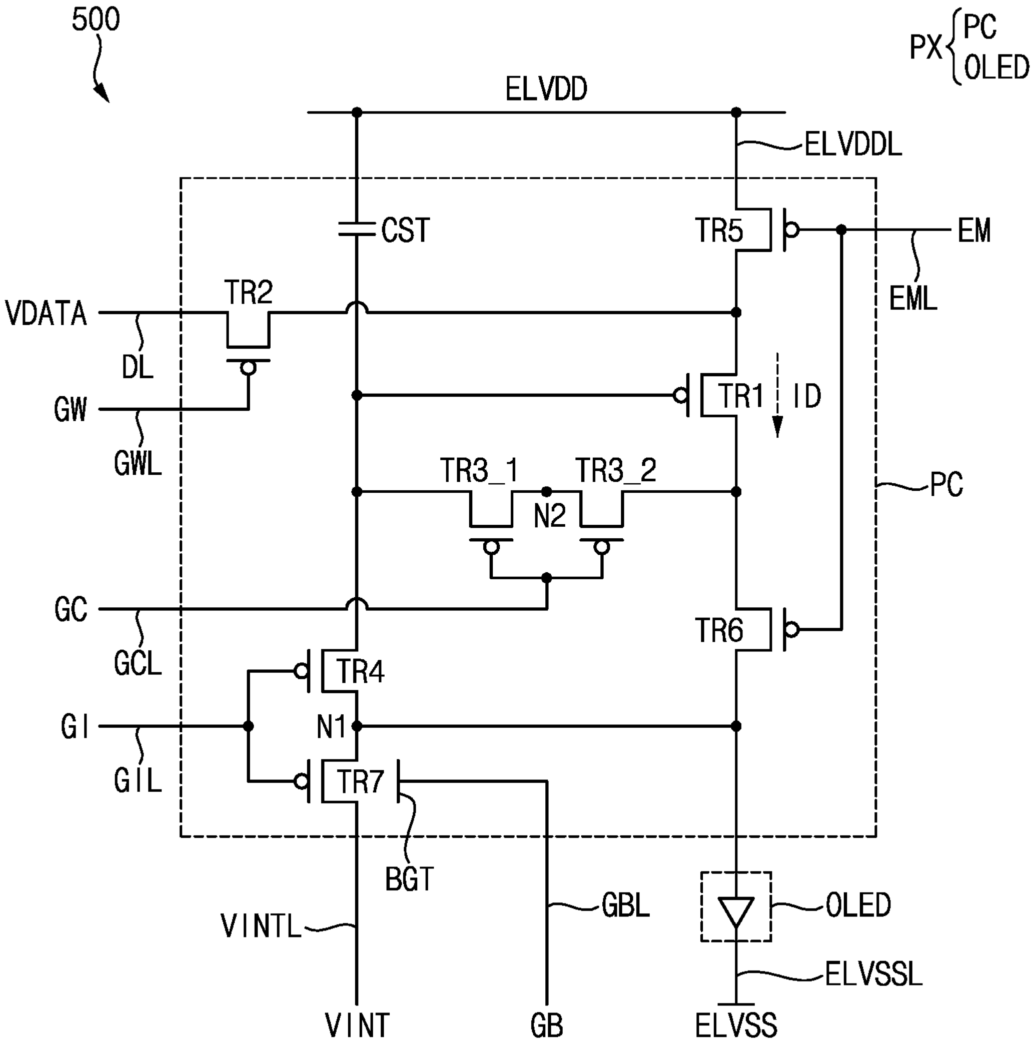
FIG. 6 is a schematic diagram of an equivalent circuit showing a pixel according to embodiments.

FIG. 6 is a schematic diagram of an equivalent circuit showing a pixel according to embodiments. A display device 500 illustrated in FIG. 6 may have a configuration that is substantially identical or similar to the configuration of the display device 100 described with reference to FIGS. 1 to 3 except for the configurations of the third transistor TR3 and the seventh transistor TR7. In FIG. 6, redundant descriptions of components that are substantially identical or similar to the components described with reference to FIGS. 1 to 3 will be omitted.

Referring to FIG. 6, the display device 500 may include a pixel PX, and the pixel PX may include a pixel circuit PC and an organic light emitting diode OLED. The pixel circuit PC may include first to seventh transistors TR1, TR2, TR3, TR4, TR5, TR6, and TR7, a storage capacitor CST, and the like within the spirit and the scope of the disclosure. The pixel circuit PC or the organic light emitting diode OLED may be connected to the first power supply voltage line ELVDDL, the second power supply voltage line ELVSSL, the initialization voltage line VINTL, the light emitting element initialization line GBL, the data line DL, the data write gate line GWL, the data initialization gate line GIL, the compensation gate line GCL, the emission line EML, and the like within the spirit and the scope of the disclosure. The first transistor TR1 may correspond to a driving transistor, and the second to seventh transistors TR2, TR3, TR4, TR5, TR6, and TR7 may correspond to switching transistors. Each of the first to seventh transistors TR1, TR2, TR3, TR4, TR5, TR6, and TR7 may include a first terminal, a second terminal, and a gate terminal. According to the embodiments, the first terminal may be a source terminal, and the second terminal may be a drain terminal. In an embodiment, the first terminal may be a drain terminal, and the second terminal may be a source terminal.

According to the embodiments, each of the first to seventh transistors TR1, TR2, TR3, TR4, TR5, TR6, and TR7 may be a PMOS transistor, and may have a channel including polysilicon. The seventh transistor TR7 may further include a second gate terminal BGT (for example, a back gate terminal or a lower gate terminal).

The third transistor TR3 may be defined as a first dual gate transistor (or a double gate transistor, a dual gate transistor, etc.). The first dual gate transistor may include a first sub-transistor TR3_1 and a second sub-transistor TR3_2. The first sub-transistor TR3_1 and the second sub-transistor TR3_2 may be connected in series, and a second node N2 may connect the first sub-transistor TR3_1 and the second sub-transistor TR3_2 to each other. In other words, the third transistor TR3 may operate as a dual gate transistor, and the same signal may be applied to a gate terminal of each of the first and second sub-transistors TR3_1 and TR3_2. Therefore, the gate electrode of each of the first and second sub-transistors TR3_1 and TR3_2 may receive the compensation gate signal GC. A second terminal of the first sub-transistor TR3_1 and a first terminal of the second sub-transistor TR3_2 may be connected to each other.

The fourth transistor TR4 and the seventh transistor TR7 may be defined as a second dual gate transistor (or a double gate transistor, a dual gate transistor, etc.). The fourth transistor TR4 and the seventh transistor TR7 may be connected in series, and the first node N1 may connect the fourth transistor TR4 and the seventh transistor TR7 to each other. The first node N1 may connect the fourth transistor TR4, the seventh transistor TR7, and the first terminal of the organic light emitting diode OLED to each other. In other words, the fourth transistor TR4 and the seventh transistor TR7 may operate as a dual gate transistor, and the same signal may be applied to the gate terminal of each of the fourth and seventh transistors TR4 and TR7. Therefore, the gate electrode of each of the fourth and seventh transistors TR4 and TR7 may receive the data initialization gate signal GI. The second terminal of the seventh transistor TR7 and the first terminal of the fourth transistor TR4 may be connected to each other.

A first gate terminal of the seventh transistor TR7 may receive the data initialization gate signal GI. The first terminal of the seventh transistor TR7 may receive the initialization voltage VINT. The second terminal of the seventh transistor TR7 may be connected to the first node N1. In other words, the seventh transistor TR7 may be connected between the initialization voltage line VINTL and the fourth transistor TR4. According to the embodiments, as described above, the seventh transistor TR7 may further include the second gate terminal BGT. The second gate terminal BGT of the seventh transistor TR7 may receive the light emitting element initialization signal GB. The light emitting element initialization signal GB may be provided from the gate driver 140 through the light emitting element initialization line GBL. The seventh transistor TR7 may supply the initialization voltage VINT to the first terminal of the organic light emitting diode OLED through the first node N1 during an activation period of the light emitting element initialization signal GB. The seventh transistor TR7 may operate in a linear region. In other words, the seventh transistor TR7 may initialize the first terminal of the organic light emitting diode OLED to the initialization voltage VINT during the activation period of the light emitting element initialization signal GB.

Since the display device 500 according to embodiments may include the seventh transistor TR7 including the second gate terminal BGT, the first terminal of the organic light emitting diode OLED may be initialized during the activation period of the light emitting element initialization signal GB. Accordingly, in low-frequency driving of the display device 500, in case that the pixel PX is driven with low and middle gray levels, the first terminal of the organic light emitting diode OLED may be initialized, so that a luminance of the organic light emitting diode OLED may not be decreased.

Since the display device 500 may include the fourth and seventh transistors TR4 and TR7 and the third transistor TR3, which function as dual gate transistors, in the low-frequency driving of the display device 500, in case that the pixel PX is driven with a high gray level, the luminance of the organic light emitting diode OLED may not be decreased. Accordingly, in case that the display device 500 is driven at a low frequency, the display device 500 may be driven without the decrease of the luminance of the organic light emitting diode OLED in all gray levels.

Furthermore, since the initialization voltage VINT is used as a power supply voltage for initializing each of the gate terminal of the first transistor TR1 and the first terminal of the organic light emitting diode OLED, a number of wires included in the pixel PX may be relatively reduced. Accordingly, an aperture ratio or a resolution of the display device 500 may be relatively increased.

In a display device including a structure in which a camera is disposed under or below a substrate, a pixel located (or disposed) on a portion in which the camera is disposed may include a transmission window. The camera may collect an external light through the transmission window. A pixel circuit may be disposed in a relatively small area of the pixel including the transmission window. According to embodiments, the pixel PX in which the number of the wires is relatively reduced may be applied to the pixel including the transmission window.

Figure 7:
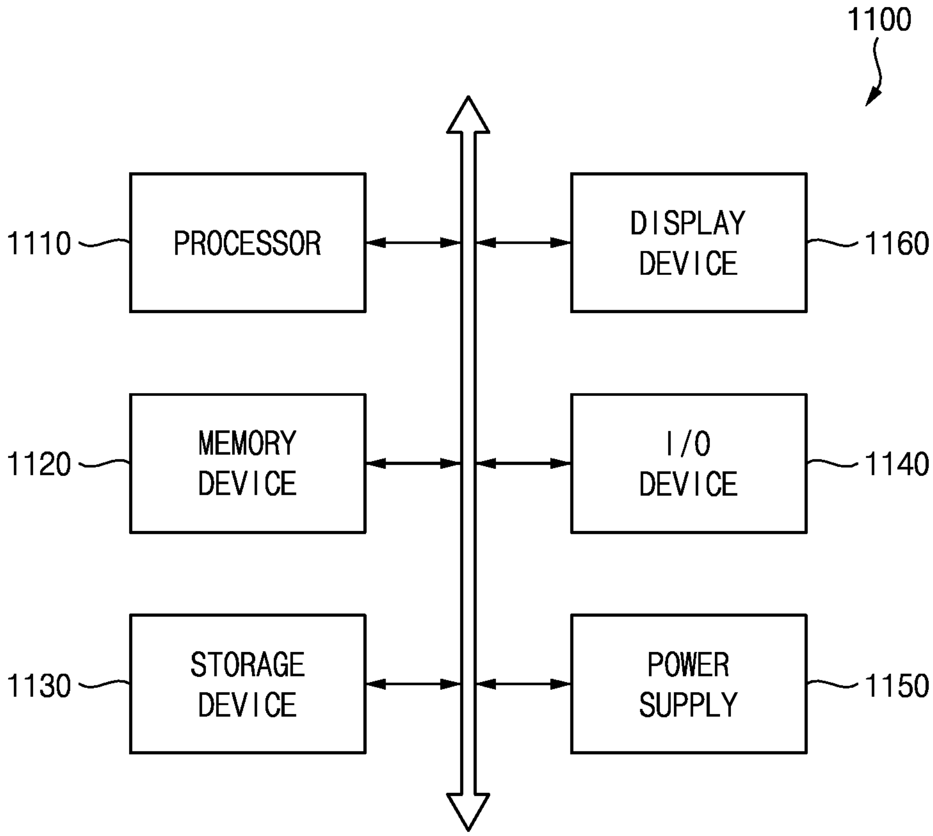
FIG. 7 is a block diagram illustrating an electronic device including a display device according to the disclosure.

FIG. 7 is a block diagram illustrating an electronic device including a display device according to the disclosure.

Referring to FIG. 7, an electronic device 1100 may include a processor 1110, a memory device 1120, a storage device 1130, an input/output (I/O) device 1140, a power supply 1150, and a display device 1160. The electronic device 1100 may further include ports for communicating with a video card, a sound card, a memory card, a universal serial bus (USB) device, other electric devices, etc., within the spirit and the scope of the disclosure.

The processor 1110 may perform various computing functions or tasks. The processor 1110 may be an application processor (AP), a microprocessor, a central processing unit (CPU), etc., within the spirit and the scope of the disclosure. The processor 1110 may be coupled or connected to other components via an address bus, a control bus, a data bus, etc., within the spirit and the scope of the disclosure. Further, in embodiments, the processor 1110 may be further coupled or connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc., within the spirit and the scope of the disclosure.

The storage device 1130 may be a solid state drive (SSD) device, a hard disk drive (HDD) device, a CD-ROM device, etc., within the spirit and the scope of the disclosure. The I/O device 1140 may be an input device such as a keyboard, a keypad, a mouse, a touch screen, etc., and an output device such as a printer, a speaker, etc., within the spirit and the scope of the disclosure. The power supply 1150 may supply power for operations of the electronic device 1100. The display device 1160 may be coupled or connected to other components through the buses or other communication links.

The display device 1160 may include a display panel including pixels, a controller, a data driver, a gate driver, an emission driver, a power supply unit, and the like within the spirit and the scope of the disclosure. Here, each of the pixels may include a pixel circuit and an organic light emitting diode, and the pixel circuit may include first to seventh transistors, a storage capacitor, and the like within the spirit and the scope of the disclosure. Each of the third, fourth, and seventh transistors may be an NMOS transistor, and the seventh transistor may further include a second gate terminal. In embodiments, the seventh transistor during the activation period of the light emitting element initialization signal, the first terminal of the organic light emitting diode may be initialized through a relatively large current, and the time for initializing the first terminal of the organic light emitting diode may become relatively shorter. Accordingly, in low-frequency driving of the display device 1160, in case that the pixel is driven with low and middle gray levels, the first terminal of the organic light emitting diode may be initialized, so that a luminance of the organic light emitting diode may not be decreased. Further, since the display device 1160 may include the third and fourth transistors that are NMOS transistors, in the low-frequency driving of the display device 1160, in case that the pixel is driven with a high gray level, the luminance of the organic light emitting diode may not be decreased. In case that the display device 1160 is driven at a low frequency, the display device 1160 may be driven without the decrease of the luminance of the organic light emitting diode in all gray levels.

According to embodiments, the electronic device 1100 may be any electronic device including the display device 1160 such as a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, or the like within the spirit and the scope of the disclosure.

The disclosure may be applied to various electronic devices including a display device. For example, the disclosure may be applied to numerous electronic devices such as vehicle-display devices, ship-display devices, aircraft-display devices, portable communication devices, exhibition display devices, information transfer display devices, medical-display devices, etc., within the spirit and the scope of the disclosure.

The foregoing is illustrative of embodiments and is not to be construed as limiting thereof. Although embodiments have been described, those skilled in the art will readily appreciate that many modifications are possible in the embodiments without materially departing from the novel teachings and advantages of the disclosure. Accordingly, all such modifications are intended to be included within the scope of the disclosure and as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. A pixel comprising:

a light emitting element having a first terminal and a second terminal and configured to emit light based on a driving current; and a pixel circuit configured to control the driving current to flow through the light emitting element between a first power supply voltage and a second power supply voltage, wherein the pixel circuit includes:

a driving transistor including a first terminal to which the first power supply voltage is applied, a second terminal electrically connected to the first terminal of the light emitting element, and a gate terminal electrically connected to a control node;

a first switching transistor including a first terminal electrically connected to a first node, a second terminal electrically connected to the control node, and a gate terminal to which a data initialization gate signal is applied; and a second switching transistor including a first terminal to which an initialization voltage is applied, a second terminal electrically connected to the first node, a first gate terminal to which the data initialization gate signal is applied, and a second gate terminal to which a light emitting element initialization signal is applied, wherein the first terminal of the light emitting element is electrically connected to the first node, and the second power supply voltage is applied to the second terminal of the light emitting element.

2. The pixel of claim 1, wherein the light emitting element is an organic light emitting diode.

3. The pixel of claim 1, wherein the second switching transistor is implemented by an NMOS transistor, and the second gate terminal of the second switching transistor is a back gate terminal.

4. The pixel of claim 1, wherein the first switching transistor and the second switching transistor are electrically connected in series as a dual gate transistor.

5. The pixel of claim 1, wherein the first switching transistor is implemented by an NMOS transistor.

6. The pixel of claim 1, wherein the initialization voltage is applied to the control node when the first switching transistor and the second switching transistor are turned on in response to the data initialization gate signal, and wherein the initialization voltage is applied to the first terminal of the light emitting element when the second switching transistor is turned on in response to the light emitting element initialization signal.

7. The pixel of claim 6, wherein, during an activation period of the data initialization gate signal, the first switching transistor and the second switching transistor are turned on, and the control node is initialized to the initialization voltage, and wherein, during an activation period of the light emitting element initialization signal, the second switching transistor is turned on, and the first terminal of the light emitting element is initialized to the initialization voltage.

8. The pixel of claim 1, wherein the pixel circuit further includes:

a third switching transistor electrically connected between the control node and the second terminal of the driving transistor.

9. The pixel of claim 8, wherein the third switching transistor is implemented by an NMOS transistor.

10. The pixel of claim 8, wherein the third switching transistor diode-connects the driving transistor in response to a compensation gate signal.

11. The pixel of claim 1, wherein the pixel circuit further includes:

a fourth switching transistor including a first terminal to which a data voltage is applied, a second terminal electrically connected to the first terminal of the driving transistor, and a gate terminal to which a data write gate signal is applied.

12. The pixel of claim 1, wherein the pixel circuit further includes:

a storage capacitor including a first terminal to which the first power supply voltage is applied and a second terminal electrically connected to the control node;

a fifth switching transistor including a first terminal to which the first power supply voltage is applied, a second terminal electrically connected to the first terminal of the driving transistor, and a gate terminal to which an emission signal is applied; and a sixth switching transistor including a first terminal electrically connected to the second terminal of the driving transistor, a second terminal electrically connected to the first terminal of the light emitting element, and a gate terminal to which the emission signal is applied.

13. A pixel comprising:

a light emitting element having a first terminal and a second terminal and configured to emit light based on a driving current; and a pixel circuit configured to control the driving current to flow through the light emitting element between a first power supply voltage and a second power supply voltage, wherein the pixel circuit includes:

a driving transistor including a first terminal to which the first power supply voltage is applied, a second terminal electrically connected to the first terminal of the light emitting element, and a gate terminal electrically connected to a control node;

a dual gate transistor electrically connected between the control node and the second terminal of the driving transistor, the dual gate transistor including a first sub-transistor and a second sub-transistor electrically connected in series;

a first switching transistor including a first terminal electrically connected to a first node, a second terminal electrically connected to the control node, and a gate terminal to which a data initialization gate signal is applied; and a second switching transistor including a first terminal to which an initialization voltage is applied, a second terminal electrically connected to the first node, a first gate terminal to which the data initialization gate signal is applied, and a second gate terminal to which a light emitting element initialization signal is applied, wherein the first terminal of the light emitting element is electrically connected to the first node, and the second power supply voltage is applied to the second terminal of the light emitting element.

14. The pixel of claim 13, wherein the light emitting element is an organic light emitting diode.

15. The pixel of claim 13, wherein the dual gate transistor, the first switching transistor, and the second switching transistor are implemented by a PMOS transistor, and the second gate terminal of the second switching transistor is a back gate terminal.

16. The pixel of claim 13, wherein the first switching transistor and the second switching transistor are electrically connected in series as a dual gate transistor.

17. The pixel of claim 13, wherein the initialization voltage is applied to the control node when the first switching transistor and the second switching transistor are turned on in response to the data initialization gate signal, and wherein the initialization voltage is applied to the first terminal of the light emitting element when the second switching transistor is turned on in response to the light emitting element initialization signal.

18. The pixel of claim 17, wherein, during an activation period of the data initialization gate signal, the first switching transistor and the second switching transistor are turned on, and the control node is initialized to the initialization voltage, and wherein, during an activation period of the light emitting element initialization signal, the second switching transistor is turned on, and the first terminal of the light emitting element is initialized to the initialization voltage.

19. The pixel of claim 13, wherein the dual gate transistor diode-connects the driving transistor in response to a compensation gate signal.

20. The pixel of claim 13, wherein the pixel circuit further includes:

a third switching transistor including a first terminal to which a data voltage is applied, a second terminal electrically connected to the first terminal of the driving transistor, and a gate terminal to which a data write gate signal is applied;

a storage capacitor including a first terminal to which the first power supply voltage is applied and a second terminal electrically connected to the control node;

a fourth switching transistor including a first terminal to which the first power supply voltage is applied, a second terminal electrically connected to the first terminal of the driving transistor, and a gate terminal to which an emission signal is applied; and a fifth switching transistor including a first terminal electrically connected to the second terminal of the driving transistor, a second terminal electrically connected to the first terminal of the light emitting element, and a gate terminal to which the emission signal is applied.

* * * * *